United States Patent [19]

Cotton de Bennetot

[11] 4,015,174
[45] Mar. 29, 1977

[54] DEVICES FOR MAGNETIC CONTROL WITH PERMANENT MAGNETS

[75] Inventor: Michel Cotton de Bennetot, Brest, France

[73] Assignee: Le Materiel Magnetique, France

[22] Filed: July 30, 1975

[21] Appl. No.: 600,238

[30] Foreign Application Priority Data

July 30, 1974 France .............................. 74.26380

[52] U.S. Cl. ................................ 361/153; 335/234; 335/236; 361/186; 361/191
[51] Int. Cl.[2] ........................................ H01H 47/32
[58] Field of Search .......... 335/183, 229, 230, 234, 335/236, 237; 317/148.5 B

[56] References Cited

UNITED STATES PATENTS

| | | | |
|---|---|---|---|
| 2,995,637 | 8/1961 | Feiner et al. | 335/183 X |
| 3,089,064 | 5/1963 | de Bennetot | 335/229 X |
| 3,530,454 | 9/1970 | Zocholl | 335/234 X |

*Primary Examiner*—Harry Moose
*Attorney, Agent, or Firm*—William Anthony Drucker

[57] ABSTRACT

A magnetic device comprising two permanent magnets, armature members forming with said magnets a closed magnetic circuit and an external air gap, and means for reversing the direction of magnetization of one of the magnets, whereby the flux is prevented to close along the magnetic circuit and caused to close through the air gap, or caused to close along the magnetic circuit, the flux in the air gap then being suppressed. The said means consist of two distinct coils wound about the magnets. One of the coils is energized for establishing the flux in the air gap, while the other coil is energized for suppressing the flux in the air gap.

4 Claims, 7 Drawing Figures

DEVICES FOR MAGNETIC CONTROL WITH PERMANENT MAGNETS

The invention relates to magnetic devices comprising permanent magnets and adapted for producing a magnetic induction in a portion of space, which may be established or suppressed, as desired, through the control of electric pulses applied to coils wound about the magnets.

Such devices are particularly used in magnetic valves.

It is an object of the invention to provide a magnetic device having control coils arranged in such a manner that the reliability and robustness of the electric control means will be comparable with those of the magnetic circuit proper. The invention more particularly is concerned with the case, frequently met with in technical applications, where an electric pulse generator cooperating with switching means, is used to obtain the remote control of a plurality of such magnetic devices.

It is a further object of the invention to provide an improved magnetic device of the type disclosed in U.S. Pat. No. 2,995,637, filed Feb. 3, 1959 by the same Applicant, for "Combined Permanent Magnet and Electromagnet."

The invention will be best understood from the following description.

In the accompanying drawings:

FIG. 1 diagrammatically shows a magnetic device in accordance with the above-mentioned earlier patent;

FIG. 3b shows a modified embodiment of the circuit of FIG. 3a,

Figure 4:
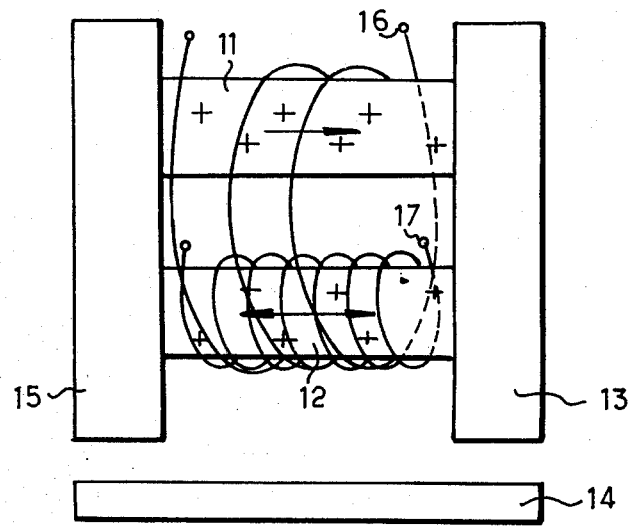
Figure 5:
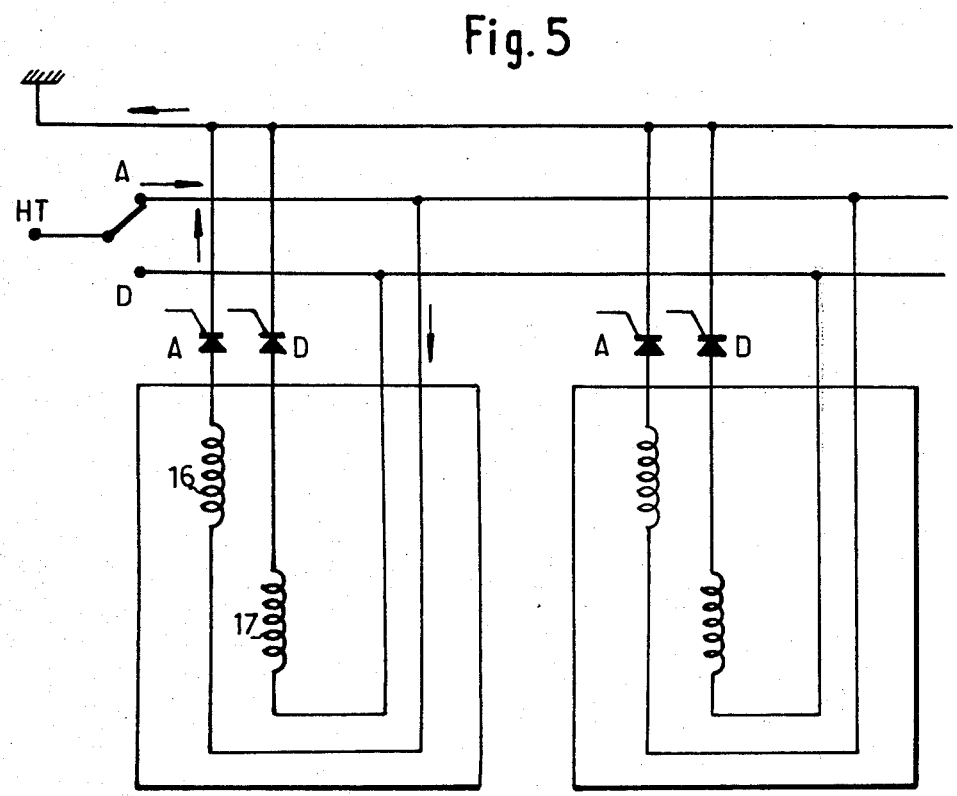
Figure 6:
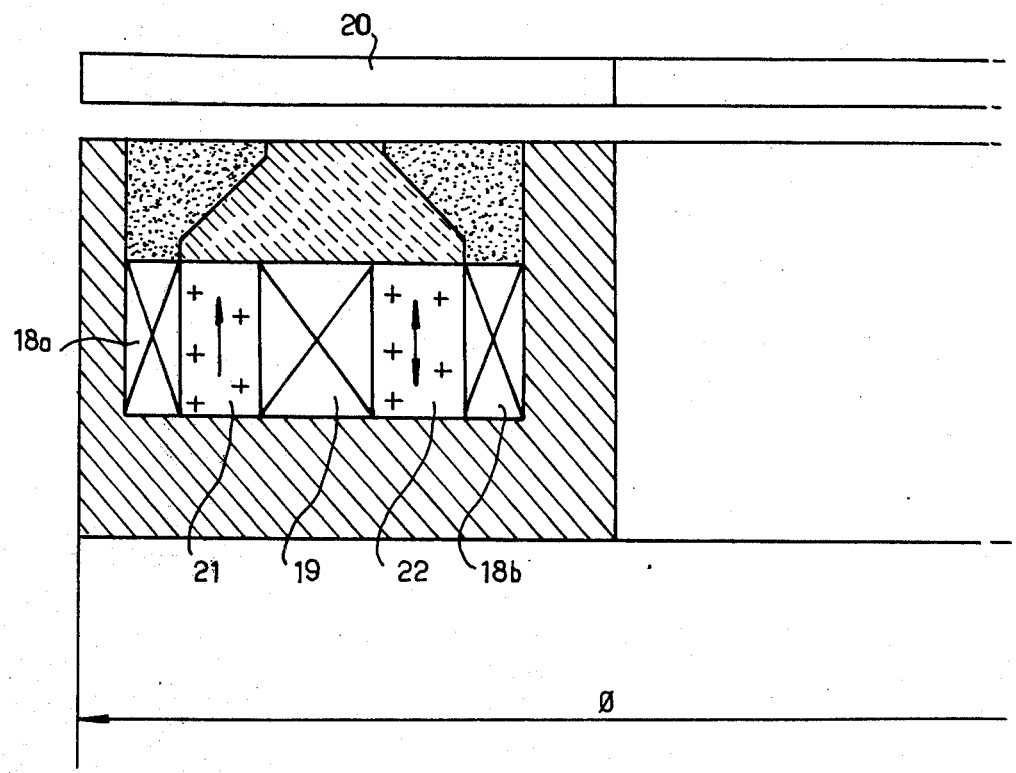

FIG. 4 diagrammatically illustrates a magnetic device in accordance an embodiment of the invention;

FIG. 5 shows an example of an electric control circuit for a plurality of magnetic devices in accordance with FIG. 4, said devices being connected in parallel; and FIG. 6 shows a preferred modified embodiment of a magnetic device according to the invention.

Figure 1:
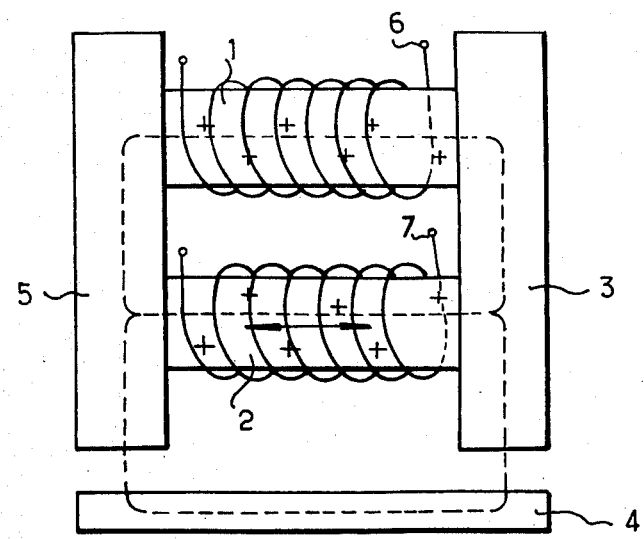

In the prior art device illustrated in FIG. 1, when the two permanent magnets 1 and 2 are magnetised in the same direction, the flux produced by these magnets follows a path which causes it to pass successively through the armature member 3, the pole piece 4 and the armature member 5, which elements are made of soft magnetic materials.

If the direction of magnetisation of magnet 2 is reversed, whilst leaving that of magnet 1 unchanged, the flux generated from magnet 1 passes thrugh armature member 3, magnet 2, armature member 5, and closes its path through magnet 1. The magnetic induction has thus at the position of pole piece 4 in practice a negligible value.

The modification of magnetic state which has just been described infers the use of appropriate means permitting to carry out the reversal of the direction of magnetisation of magnet 2 whilst leaving unchanged the direction of magnetisation of magnet 1.

In the prior art example presently described, permanent magnet 2 cooperates with a winding which permits it to be magnetised in the same direction as magnet 1 or in the opposite direction, as is indicated by the arrow on FIG. 1.

Magnet 1, the magnetisation of which is of non-variable direction, could have winding, wound thereon provided that it retains the initial magnetisation which has been applied to it.

When it is desired to suppress almost completely the magnetic induction in the region of the pole piece 4 the operation of a magnetic device such as that of FIG. 1 requires that the flux issuing from one of the magnets shall be practically equal to the flux entering into the other magnet.

It has been found in practice that in order to obtain the equality of the said fluxes it is generally useful to associate an electrical winding with the magnet 1, in order to effect its successive remagnetisations in the same direction.

However, the applicant has found that an inconvenience could result from the use of windings arranged as shown in FIG. 1. When it is desired to establish magnetic induction in the region of pole piece 4, it is necessary to magnetise the magnets 1 and 2 in the same direction; the magnetic flux produced by the winding 6 for the purpose of magnetising the magnet 1 in the proper direction tends to reverse the direction of magnetisation of the magnet 2. In the same manner, when the winding 7 is used to magnetise the magnet 2 in the same direction as the magnet 1; the current which passes through it produces at the exterior of the winding a magnetic flux which tends to reverse the direction of magnetisation of magnet 1.

The inconveniences associated with this phenomenon are particularly noticeable when the magnet 1 is at a small distance from the winding 7 — and similarly when the magnet 2 is at a small distance from the winding 6. Now, in technical applications, it is almost always desired to dispose the various components of the magnetic circuit at small separation in order to limit the total bulk of the device as well as losses of magnetic flux.

The inconveniences of this arrangement are likewise very noticeable when there are used coils the length of which, parallel to the axis of magnetisation, is less than the diameter or, in a more general manner, than the internal dimensions of the coil. The induction of such flat coils is in effect particularly high at the exterior of the winding, contrary to that which is obtained in the case of elongated windings. Now the use of hard magnetic materials of high coercivity leads to the use of magnets having demagnetising fields of several hundreds of Oersteds; as a result the modern magnets have more and more tended to be used in the form, not of a body elongated in the direction of magnetisation, but on the contrary of flat discs, of small length in the direction of magnetisation and of large section. As a result, the magnetising windings tend to approach the shape of a flat plate, with high external magnetic losses. The present invention seeks to avoid, wholly or in part, the above described difficulty.

It has also for its object to facilitate the remote control of the windings. For practical reasons one was generally, in prior art devices, led to connect the windings 6 and 7 in series with the voltage source.

In effect should the windings be connected in parallel across the voltage source, the distribution of the current intensities between the windings 6 and 8 would depend upon several parameters, particularly variations of induction in the different parts of the magnets and as a result there would be a desynchronisation of the operations of excitation of the two magnets. Furthermore, and this has a great technical importance, it is not in practice possible, by measuring the intensity of current supplied by the generator, to ascertain the number of ampere-turns applied to each of the windings during each pulse. For these reasons, the control of an apparatus comprising a generator associated with a plurality of magnetic devices such as that of FIG. 1 has generally been effected, until now, with winding connected in series rather than in parallel.

Figure 2:
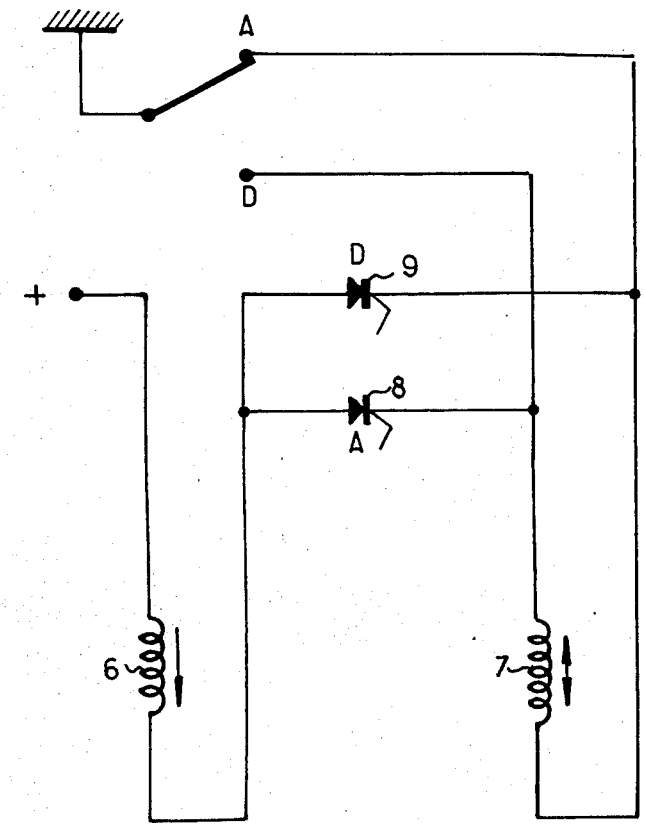
FIG. 2 shows an example of an electric control circuit of the device for FIG. 1.

If one uses unidirectionally conducting electronic components, such as thyristors, in order to reverse the direction of flow of current in the winding 7, it can be seen on FIG. 2 that these thyristors 8 and 9 must be arranged between the windings 6 and 7 when these latter are mounted in series on the pulse generator. They are consequently found to have a floating potential applied to their cathode and to their gate, which potential is different at rest and during the passage of the electric pulse, whilst a device permitting this potential to remain practically constant would be technically much more satisfactory.

Figure 3A:
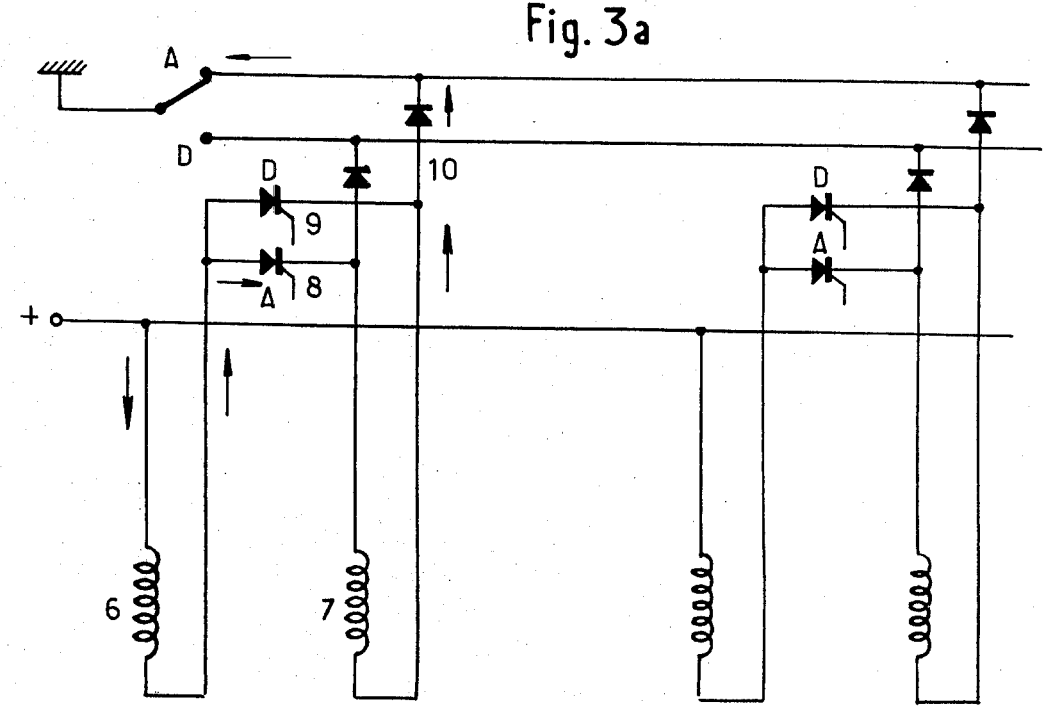
FIG. 3a shows an example of an electric control circuit for a plurality of such devices, connected in parallel.
Figure 3B:
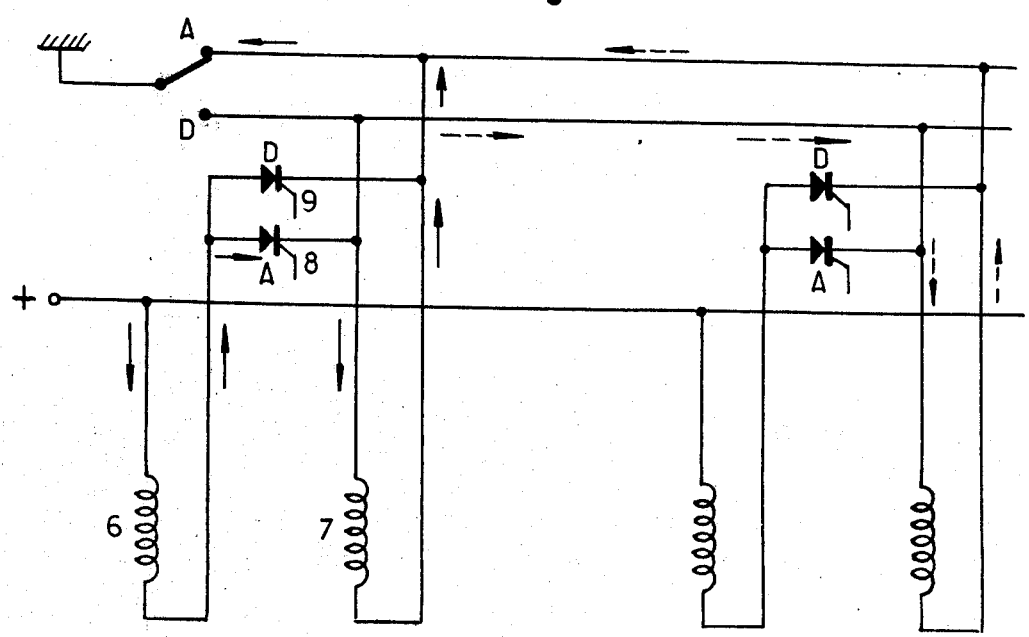

In the case where several magnetic devices are mounted in parallel on the same generator, it can be seen that it is furthermore useful to add other unidirectionally conducting electronic components, such as the two diodes indicated at 10 on FIG. 3a in order to prevent the establishment of unwanted losses of current, shown by the arrows in dotted lines in FIG. 3b, between the windings of the various devices.

The magnetic circuit shown in FIG. 4 comprises, in known manner, a pair of magnets such as 11 and 12, the magnetisation of the magnet 11 remaining unchanged in direction, the magnetisation of the magnet 12 being reversed in order to obtain the establishment or suppression of the magnetic flux in the region of the pole piece 14.

Two windings are associated with the magnetic circuit proper in order to obtain modification of the direction of magnetisation of the magnet 12 and to keep unchanged in direction that of the magnet 11.

According to the invention, the winding 16 serves solely for the establishment of the magnetic flux, whilst the winding 17 serves exclusively for the partial or total suppression of the flux.

The winding 16 is used when it is desired to produce a magnetic induction in the region of the pole piece 14. It is then traversed by an impulse of current which magnetises the magnets 11 and 12 in the same direction.

The coil 16 can comprise, as indicated on FIG. 4, a single winding carrying out the magnetising of the magnets 11 and 12: this arrangement has the very important practical advantage of avoiding the inconvenience shown above and which is associated with the effects of separate windings surrounding the magnets 11 and 12 and the external fluxes of which tend to oppose, for each winding, the internal flux of the other.

When this inconvenience is not prohibitive or when the available dimensions require it, the coil 16 can be constituted by several windings: for example, in the modification of the device of FIG. 4, the coil 16 will consist of a first winding surrounding the magnet 11 and of a second winding, mounted in series with the first winding and surrounding the magnet 12.

The coil 17 is used when it is desired to suppress the magnetic induction in the region of the pole piece 14.

It permits the magnetisation of the magnet 12 in a direction opposed to that which corresponds to energization of the coil 16.

The coil 17 can be constituted by a single winding, surrounding the magnet 12 as has been shown in FIG. 4. The induction produced at the interior of this winding tends to magnetise the magnet 12 in the direction opposite to that of the magnet 11, whereas the induction produced at the exterior of the winding tends to maintain the magnetisation of the magnet 11 in the same direction.

Meanwhile, for practical reasons one may be led to make the coil 17 with several windings. In a modification of the device of FIG. 4, for example, the coil 17 could comprise a winding surrounding the magnet 12 and another winding, mounted in series with the preceding one, surrounding the magnet 11.

Each of these windings effects the magnetisation of the corresponding magnet when it is desired to suppress the force of attraction in the region of the pole piece 14; more precisely the direction of magnetisation of magnet 12 is reversed, while magnet 11 is re-magnetised in the same direction.

Finally, the device disclosed is essentially characterised by the use of two separate coils, one being used for the establishment of the external flux in the region of the pole piece 14, the other being used for suppressing this flux. The coil 16 acts on magnet 12 of which the direction of magnetisation is reversed and, accessorily, on the magnet 11 of which the direction of magnetisation remains unchanged.

Such a magnetic device is particularly simple to control by an electrical impulse generator cooperating with electronic switching means. FIG. 5 shows a circuit arrangement in which an unidirectionally conducting electronic component is mounted in series with the coil 16, and another unidirectionally conducting component of the same type is mounted in series with the coil 17, for obtaining the establishment and the suppression of the magnetic induction in the region of the pole piece 14. In the case where the components used are thyristors, it will be noted that these have a cathode and gate potential which is non-floating and that it is furthermore not useful to use diodes in order to prevent losses of current between the coils of the respective magnetic devices which are mounted in parallel on the same electrical generator.

FIG. 6 shows a modification wherein the magnetic device has an axis of symmetry.

Coil 18 which consists of windings 18a and 18b mounted in series and respectively arranged outside magnet 21 and inside magnet 22, effects the magnetisation of the magnets in the same direction whereas coil 19, disposed between the magnets, carries out the inversion of the direction of magnetisation of magnet 22, and retains unchanged the direction of magnetisation of magnet 21. The flux in the region of the pole piece 20 is thus established by use of the coil 18 and suppressed by use of the coil 19.

It will be obvious that the devices described and shown could be subject to variations of construction without departing from the spirit of the invention. Their application to the construction of magnetic valves is not limitative.

I claim:

1. Magnetic device comprising at least one pair of permanent magnets, armature members forming with at least said one pair a closed magnetic circuit and also defining at least one air gap external to said circuit, said magnetic device comprising first and second coil and means energizing said coils for inverting the direction of magnetisation of one of the magnets of at least said one pair in such a manner as to modify the path of magnetic flux, by obliging it in one case to re-close itself by passing through at least said one air gap and in the other case, after inverting of the direction of magnetisation of one of the magnets, to re-close itself through the said magnet and partially or wholly suppressing the flux in the region of at least said one air gap, wherein only the first coil is energized for establishing the magnetic flux in the region of at least said one air gap, and only the second coil is energized for obtaining the partial or total suppression of the said flux, the direction of flow of current being constant in each of the coils.

2. Magnetic device in accordance with claim 1, wherein the said closed magnetic circuit has a symmetry of revolution and comprises first and second annular magnets, the first magnet being concentrically arranged about the second magnet, the first coil having first and second serially connected windings, the first winding being arranged outside the first magnet, the second winding being arranged inside the second magnet being disposed at each side of the magnets, and the second coil having a single winding arranged between the first and second magnets.

3. Magnetic device in accordance with claim 1, wherein said coils each have first and second terminals, said energizing means comprising a pulse generator having first and second outputs, first and second unidirectionally conducting electronic components respectively connecting the first terminal of the first and second coils to the said second output, and switching means connecting the said first output to the second terminals of the first and second coils.

4. Apparatus comprising a plurality of magnetic devices as claimed in claim 1, wherein said coils each have first and second terminals, said energizing means comprising a single pulse generator having first and second outputs, first and second unidirectionally conducting components respectively connecting in parallel the first terminal of each said first and second coils to the said second output, and switching means connecting in parallel to said first output to the second terminals of each said first and second coils.

* * * * *